Feb. 21, 1933.          E. K. BAKER          1,898,334
AUTOMOBILE ARM AND ROD CONNECTION
Filed April 19, 1930
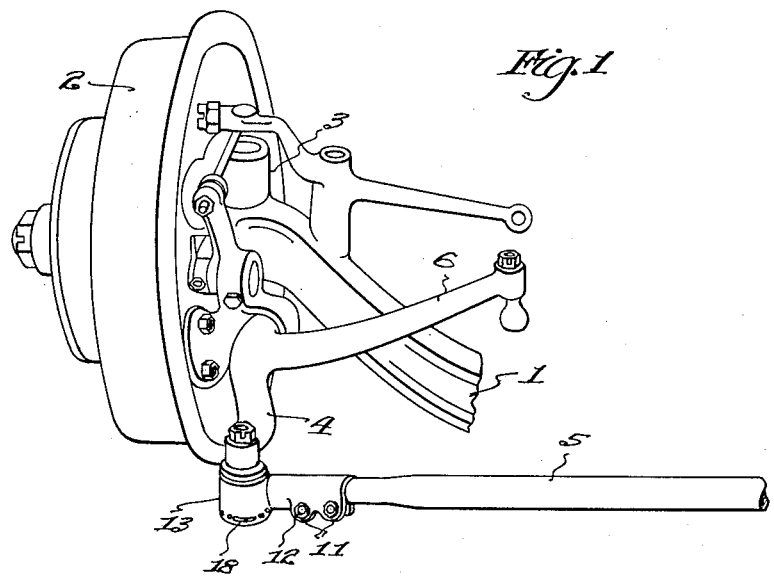
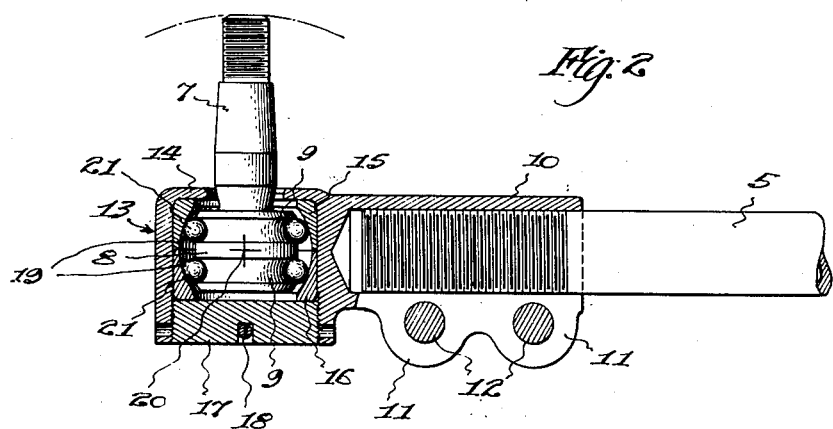
INVENTOR
Eric K. Baker
BY
ATTORNEY Patented Feb. 21, 1933

1,898,334

UNITED STATES PATENT OFFICE

ERLE K. BAKER, OF CHICAGO, ILLINOIS

AUTOMOBILE ARM AND ROD CONNECTION

Application filed April 19, 1930. Serial No. 445,600.

This invention relates to improvements in automobile arm and rod connections and it consists of the matters hereinafter described and more particularly pointed out in the appended claim.

The primary object of the invention is to provide a simple and efficient connection between certain parts of an automobile as between the knuckle arms and tie rod or link and like parts associated therewith.

Another object of the invention is to provide a connection of this kind wherein a head carried by one member is formed with raceways or grooves to receive a plurality of rows of anti-friction bearings that engage in a spherical interior bearing surface of an associated member whereby the head is capable of an anti-friction universal oscillation therein.

Another object of the invention is to provide a connection of this kind, which is practical and which after once being assembled requires no further adjustment of any of the parts thereof.

These objects of the invention as well as others together with the many advantages thereof will more fully appear as I proceed with my specification.

In the drawing:—

Fig. 1 is a fragmentary perspective view of a connection embodying my invention as when employed between the arm of a steering knuckle and one end of an associated tie rod or link.

Fig. 2 is a vertical sectional view on an enlarged scale through a connection of this kind embodying my invention.

Referring now in detail to that embodiment of the invention illustrated in the accompanying drawing, 1 indicates the front axle of an automobile and 2 indicates the brake drum and coacting parts of a wheel (not shown) associated with said axle and operatively connected thereto by means of a steering knuckle 3. Said knuckle includes an arm 4 that is operatively connected to the like arm of the associated knuckle by a tie rod or link 5 and the left hand knuckle includes a thrust arm 6 which is operatively connected by a thrust rod (not shown) with the usual steering mechanism as is well known in automobiles.

Fixed to and depending from the free end of the arm 4 is a stud 7 having a body adapted for a tapered fit in said arm and at the bottom of said head is a circular or cylindrical head 8 having longitudinally spaced annular raceways or grooves 9 therein as clearly shown in Fig. 2.

On the end of the tie rod or link 5 which may be of either a solid or tubular cross section there is provided a member 10 preferably made separate from said rod and adapted for screw threaded adjustment thereon. The body of this member is split longitudinally at one side and is there provided with ears 11 to receive bolts 12 whereby after said member has been properly positioned on said rod or link it may be securely fixed thereto.

The free end of the body of said member 10 is formed to provide a hollow boss 13, interiorly threaded at one end and having an inwardly extending radial flange 14 at its other end.

Within said hollow boss and engaged against the flange 14 is a ring 15 and associated therewith to surround the head 8 of the stud 7 is a second ring 16 held in operative relation to the first ring by a plug 17 threaded into that end of the boss 13 opposite the flange 14. This plug is locked in the boss by a pin 18.

The interior surfaces of the rings 14 and 15 are made spherical as at 19 about a center 20 that is coincident with the center of the head 8. In the raceways or grooves 9 of the head are located rows of balls 21 that engage with the interior spherical surfaces 19 of the rings 15 and 16.

The construction described provides an anti-friction spherical connection between the stud 7 and boss 13 whereby the stud may oscillate freely in all directions. In the assembly of the parts the space within the boss between the flange 14 and plug 17 and the rings 15 and 16 is packed with a lubricant and after the plug 17 has been once properly adjusted and locked in place, the connection requires no further attention.

The connection described admirably lends itself to screw machine production work and therefore can be made in large quantities at a low cost. The parts may be readily assembled by relatively inexperienced operators as no fine adjustments need be taken into consideration during the assembly.

While in describing the invention, I have referred in detail to the form, arrangement and construction of the parts thereof, the same is to be considered as illustrative only so that I do not wish to be limited thereto except as may be specifically set forth in the appended claim.

I claim as my invention:—

In a tie rod construction a housing member having a bore therein with an inwardly extending flange at one end and a plug in the other end, a pair of ring members in said bore and engaged respectively with said flange and plug and which pair of rings provide a substantially spherical inner bearing surface, a stud having a substantially cylindrical head disposed in said rings concentric with said inner bearing surface and which head has concave annular grooves therein, one for each ring, and antifriction elements having substantially the same radius of curvature as said grooves disposed in said grooves and engaged with said spherical inner bearing surface.

In testimony whereof, I have hereunto set my hand, this 16th day of April, 1930.

ERLE K. BAKER.